(12) United States Patent
Kodaira et al.

(10) Patent No.: US 6,493,067 B1
(45) Date of Patent: Dec. 10, 2002

(54) ROTARY LASER IRRADIATING SYSTEM

(75) Inventors: Jun-ichi Kodaira; Fumio Ohtomo, both of Tokyo-to (JP)

(73) Assignee: Kabushiki Kaisha Topcon, Tokyo-to (JP)

( * ) Notice: Subject to any disclaimer, the term of this patent is extended or adjusted under 35 U.S.C. 154(b) by 0 days.

(21) Appl. No.: 09/473,732

(22) Filed: Dec. 28, 1999

(30) Foreign Application Priority Data

Dec. 29, 1998 (JP) .......................................... 10-377087

(51) Int. Cl.$^7$ ........................... G01C 3/08; G01B 11/26
(52) U.S. Cl. .................... 356/4.08; 356/4.01; 356/5.01; 356/141.1; 356/141.2
(58) Field of Search .............................. 356/4.08, 5.01, 356/5.15, 141.1, 139.04, 139.08

(56) References Cited

U.S. PATENT DOCUMENTS

| | | | |
|---|---|---|---|
| 5,291,262 A | * | 3/1994 | Dunne |
| 5,612,781 A | | 3/1997 | Ohtomo et al. .......... 356/152.2 |
| 5,898,490 A | * | 4/1999 | Ohtomo et al. .......... 356/141.3 |
| 6,075,586 A | * | 6/2000 | Ohtomo et al. ............ 356/4.08 |
| 6,249,338 B1 | * | 6/2001 | Ohtomo et al. ............ 356/4.08 |

* cited by examiner

*Primary Examiner*—Stephen C. Buczinski
(74) *Attorney, Agent, or Firm*—Nields & Lemack

(57) ABSTRACT

The rotary laser irradiating system according to the present invention comprises a main unit, a rotator rotatably mounted on said main unit, and a range-finding unit disposed on said main unit, wherein said main unit comprises a light emitting unit for emitting a laser beam, optical means for directing said laser beam and a range-finding light from said range-finding unit toward said rotator, and tilt sensors for detecting horizontality and verticality of a rotation axis of said rotator, said rotator comprises deflecting means for deflecting the laser beam and the range-finding light from said optical means and rotating position detecting means for detecting a rotating position of the rotator, and said rotating position detecting means being designed to project said laser beam and said range-finding light in a predetermined direction.

13 Claims, 8 Drawing Sheets

SIGNAL ON POLARIZATION MAINTAINING SIDE
SIGNAL ON POLARIZATION CONVERTING SIDE

FIG. 10 (B)

SIGNAL ON POLARIZATION MAINTAINING SIDE
SIGNAL ON POLARIZATION CONVERTING SIDE

ROTARY LASER IRRADIATING SYSTEM

BACKGROUND OF THE INVENTION

The present invention relates to a rotary laser irradiating system for forming a reference plane in works such as room interior finishing work, partitioning work, etc., and in particular, to a rotary laser irradiating system with a range-finding unit.

In the process of room interior finishing work, partitioning work, etc., marking operation is performed. In the conventional type marking operation, a method has been practiced. In this method, a horizontal reference plane and a vertical reference plane or a horizontal reference line and a vertical reference line are formed by a rotary laser irradiating system. And points at predetermined dimension are drawn using the horizontal reference plane and the vertical reference plane or the horizontal reference line and the vertical reference line.

The rotary laser irradiating system comprises detecting means for detecting a horizontal plane and a vertical plane. By projecting a laser beam to the horizontal plane and the vertical plane by rotary irradiation, a laser reference plane is formed. Further, by projecting the laser reference plane on a floor surface, a wall surface, etc., horizontal and vertical reference lines are formed. Then, the operator can perform final positioning based on the reference lines.

The rotary laser irradiating system as described above basically indicates horizontal and vertical references and does not indicate a position where the points should be drawn. The use of a range finder may not always be required for simple measurement but it is necessary to draw points and perform positioning using at least means such as tape measure. In case horizontal and vertical planes are measured 3-dimensionally, a survey instrument capable to measure distance and angle may be required. This does not substantially solve such problems as the reduction of the number of operators and the improvement of working efficiency.

SUMMARY OF THE INVENTION

It is an object of the present invention to combine a rotary laser irradiating system with a range-finding unit, and by finding a distance from the rotary laser irradiating system main unit, a distance between two points in a rotating direction is displayed. This contributes to the reduction of the number of operators and to the improvement of working efficiency. Further, by designing the range-finding unit as removable type, it is possible to provide the convenience in the handling of the system.

To attain the above object, the rotary laser irradiating system according to the present invention comprises a main unit, a rotator rotatably mounted on the main unit, and a range-finding unit disposed on the main unit, wherein the main unit comprises a light emitting unit for emitting a laser beam, optical means for directing the laser beam and a range-finding light from the range-finding unit toward the rotator, and tilt sensors for detecting horizontality and verticality of a rotation axis of the rotator, the rotator comprises deflecting means for deflecting the laser beam and the range-finding light from the optical means and rotating position detecting means for detecting a rotating position of the rotator, and the rotating position detecting means being designed to project the laser beam and the range-finding light in a predetermined direction. Also, the present invention provides a rotary laser irradiating system as described above, wherein the tilt sensor comprises a tilt sensor for detecting horizontality of the rotation axis, and the rotating position detecting means being designed to project the laser beam and the range-finding light to a plane including the rotation axis. Further, the present invention provides a rotary laser irradiating system as described above, wherein the deflecting means transmits a part of the laser beam and the range-finding light in parallel to the rotation axis of the rotator. Also, the present invention provides a rotary laser irradiating system as described above, wherein the range-finding unit comprises means for modulating the range-finding light and synthesizes a range-finding data by modulating the range-finding light and transmits the data. Further, the present invention provides a rotary laser irradiating system as described above, wherein there is further provided an object reflector, the laser beam emitted from the light emitting unit is a visible light, the object reflector comprises diffusion means for diffusing the laser beam from the deflection means to visually confirm the laser beam, photo-detecting means for receiving the range-finding light from the deflecting means, reflection members for reflecting the range-finding light, a photodetection circuit for detecting a range-finding data from the range-finding light based on a signal from the photodetecting means, and a display unit for displaying the range-finding data. Also, the present invention provides a rotary laser irradiating system as described above, wherein the objet reflector comprises reflection members for reflecting the laser beam, the main unit comprising a photodetection unit for receiving the laser beam reflected by the object reflector, and rotation of laser irradiation is stopped on the object reflector when the reflected laser beam is received at the photodetection unit. Further, the present invention provides a rotary laser irradiating system as described above, wherein the objet reflector comprises a light emitting element for emitting a light toward the deflecting means, and a modulation circuit for modulating the light beam from the light emitting element and for synthesizing a data to be transmitted to the main unit. Also, the present invention provides a rotary laser irradiating system as described above, wherein the range-finding unit is removably arranged with respect to the main unit. Further, the present invention provides a rotary laser irradiating system as described above, wherein the main unit comprises a light emission control unit for modulating the laser beam from the light emitting unit, said light emission control unit modulates the laser beam based on a range-finding data from the range-finding unit and the range-finding data is transmitted according to the modulation. Also, the present invention provides a rotary laser irradiating system as described above, wherein the main unit comprises focusing means and said focusing means focuses the laser beam on the object reflector based on the range-finding data. Further, the present invention provides a rotary laser irradiating system as described above, wherein a first position and a second position designated by the object reflector are measured by the range-finding unit and the rotating position detecting means, and a distance from the first position to the second position is calculated according to the measurement data. Also, the present invention provides a rotary laser irradiating system as described above, wherein the distance from the first position to the second position is displayed on the display unit of the object reflector. Further, the present invention provides a rotary laser irradiating system as described above, wherein there is provided a tilt sensor for detecting horizontality of a plane perpendicular to the rotation axis, and a distance from the first position to the second position is measured on the horizontal plane.

If the main unit is installed in such manner that a rotation axis of the rotator will be in a horizontal direction, a reference line with any desired tilt angle can be formed by setting the rotating position of the rotator based on the rotating position detecting means. At the same time, distance can be measured, and the result of distance measurement can be transmitted to the photodetection side via the range-finding light.

DETAILED DESCRIPTION OF THE PREFERRED EMBODIMENTS

Description will be given below on embodiments of the present invention referring to the attached drawings.

Figure 1:
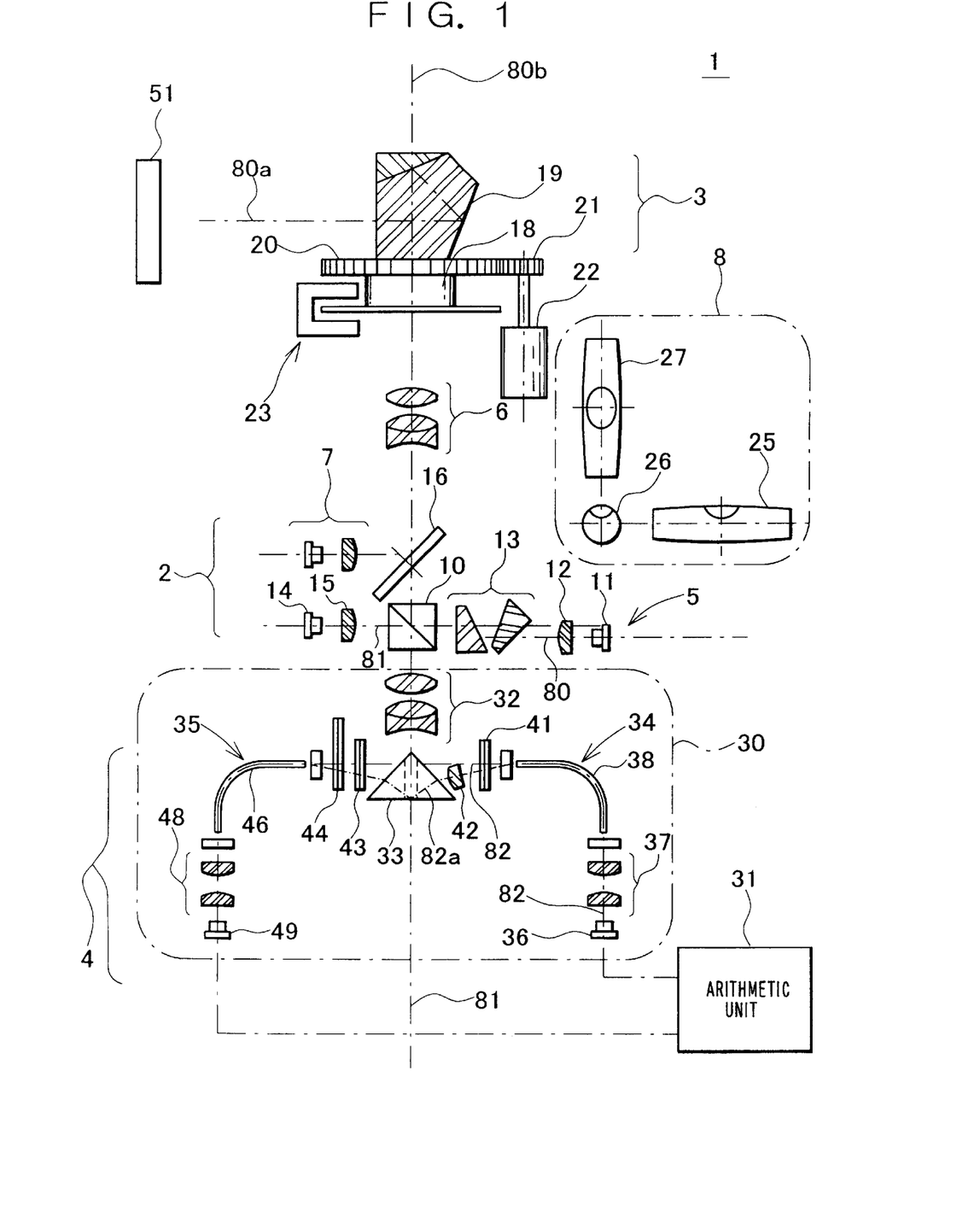
FIG. 1 is a schematical drawing to show an arrangement of an essential portion of an embodiment of the present invention.

FIG. 1 shows an essential portion of a rotary laser irradiating system 1. The rotary laser irradiating system 1 comprises a main unit 2, a rotator 3 rotatably mounted on the main unit 2, and a range-finding unit 4 removably arranged on the main unit 2. On the main unit 2, there are provided a reference light emitting unit 5 for emitting a reference laser beam, a focusing optical system 6, a photodetection unit 7, a tilt detecting unit 8, and a control unit 9 (to be described later).

First, the light emitting unit 5 will be described.

With a beam splitter 10 positioned at the middle, a first laser diode 11 for emitting a visible laser beam 80 is disposed on one side. On the optical axis of the first laser diode 11 and between the first laser diode 11 and the beam splitter 10, there are provided a collimator lens 12 for turning the laser beam to parallel beams and an anamorphic lens 13 for changing the light beam to have circular cross-section. On the other side of the beam splitter 10, i.e. on the side opposite to the first laser diode 11 with the beam splitter 10 at the middle, a second laser diode 14 for emitting a visible laser beam 81 is disposed. On the optical axis of the second laser diode 14 and between the second laser diode 14 and the beam splitter 10, a collimator lens 15 is disposed.

The beam splitter 10 reflects the laser beam 80 from the first laser diode 11 and the laser beam 81 from the second laser diode and allows to pass a range-finding light 82 from an LED 36 which is to be described later.

The laser beam 80 from the first laser diode 11 is reflected by the beam splitter 10, and it passes through an aperture mirror 16 and is directed to the focusing optical system 6. Lens groups of the focusing optical system 6 are arranged between the beam splitter 10 and the rotator 3, and the laser beam 80 from the reference light emitting unit 5 reflected by the beam splitter 10 is guided toward the rotator 3 in such manner that the laser beam is focused to the position of an object to be measured according to range-finding data from the range-finding unit 4. The laser beam 81 emitted from the second laser diode 14 is reflected by the beam splitter 10 and is irradiated toward the opposite side of the laser beam 80.

Now, description will be given on the rotator 3.

A prism holder 18 is rotatably supported around the optical axis of the laser beam coming from the beam splitter 10. A pentagonal prism 19 is fixed on the prism holder 18. The pentagonal prism 19 deflects a part 80a of the laser beam 80 from the reference light emitting unit 5 at an angle of 90°, while it allows the remaining part 80b of the laser beam 80 to pass. A scanning gear 20 is fixed on the prism holder 18, and a driving gear 21 is engaged with the scanning gear 20. The driving gear 21 is driven and rotated by a scanning motor 22. An encoder 23 for detecting rotation of the prism holder 18 (i.e. the pentagonal prism 19) is arranged on the prism holder 18.

The photodetection unit 7 detects a reflection light when the laser beam 80a emitted from the pentagonal prism 19 is reflected by the object reflector 51 and the reflection light enters the rotary laser irradiating system 1, and the light is received, which has passed through the pentagonal prism 19 and has been reflected by the aperture mirror 16.

The tilt detecting unit 8 comprises an X-axis tilt sensor 25, a Y-axis tilt sensor 26, and a Z-axis tilt sensor 27 perpendicularly running in each of three axes respectively. When a reflection optical axis of the beam splitter 10 runs in a vertical direction, the X-axis and the Y-axis form a horizontal plane, and the Z-axis and the X-axis form a vertical plane. The main unit 2 is designed in such structure that it can be installed at a position as it is rotated by an angle of 90° around an axis running in parallel to the X-axis (preferably, the X-axis) from the position shown in FIG. 1. When the main unit 2 is at a position rotated by an angle of 90° around an axis parallel to the X-axis (preferably, the X-axis) from the position shown in FIG. 1, the X-axis and the Y-axis form a vertical plane, and the Z-axis and the X-axis form a horizontal plane.

The X-axis tilt sensor 25 and the Y-axis tilt sensor 26 detect tilting of the rotary laser irradiating system 1 at the position shown in FIG. 1. The X-axis tilt sensor 25 and the Z-axis tilt sensor 27 detect tilting of the rotary laser irradiating system 1 at a position rotated by an angle of 90° from the position shown in FIG. 1.

Next, description will be given on the range-finding unit 4.

The range-finding unit 4 comprises a range-finding optical system 30 and a range-finding arithmetic unit 31. First, the range-finding optical system 30 is described.

On the reflection optical axis of the beam splitter 10 and on the opposite side of the aperture mirror 16 with the beam splitter 10 at the middle, a collimator lens 32 and an aperture prism 33 are disposed. With the aperture prism 33 at the middle, a range-finding light emitting unit 34 is arranged on one side and a range-finding light photodetection unit 35 is disposed on the other side. When the laser beam 81 is not emitted, there is no need that the aperture prism 33 has an aperture.

The range-finding light emitting unit 34 comprises an LED 36 for emitting the range-finding light 82. The range-finding light 82 emitted from the LED 36 passes through a collimator lens 37 and an optical fiber 38 and is projected toward the aperture prism 33. The range-finding light 82 irradiated from the optical fiber 38 is turned to the range-finding light 82 and a reference light 82a by an optical path switching slit 41. The range-finding light 82 is reflected by the aperture prism 33 and is turned to parallel beams by the collimator lens 32. After passing through the beam splitter 10 and the aperture mirror 16, the range-finding light 82 enters the pentagonal prism 19. A part of the range-finding light 82 is deflected at an angle of 90° by the pentagonal prism 19 and is directed toward the object reflector 51, and the remainder of the light passes through the pentagonal prism 19. As the range-finding light 82, the light of invisible wavelength range is used so that an observer may not visually confuse it with the laser beam 80.

After being irradiated from the optical fiber 38 and being switched over from the range-finding light 82 by the optical path switching slit 41, the reference light 82a passes through a condenser lens 42 and enters the aperture prism 33. At the aperture prism 33, it is deflected at a predetermined angle and is reflected by internal reflection and passes through to the opposite side. The transmitted reference light 82a enters the range-finding light photodetection unit 35.

The range-finding light photodetection unit 35 comprises a band-pass filter 43 and a density filter 44, which are positioned on the opposite side of the optical path switching slit 41 with the aperture prism 33 at the middle. The range-finding laser beam passing through the band-pass filter 43 and the density filter 44 enters a rang-finding light photodetection element 49 via an optical fiber 46 and a condenser lens 48.

The range-finding arithmetic unit 31 comprises a driver (not shown) for driving the LED 36 and calculates a distance to the object reflector 51 based on a photodetection signal from the range-finding light photodetection element 49.

Figure 2:
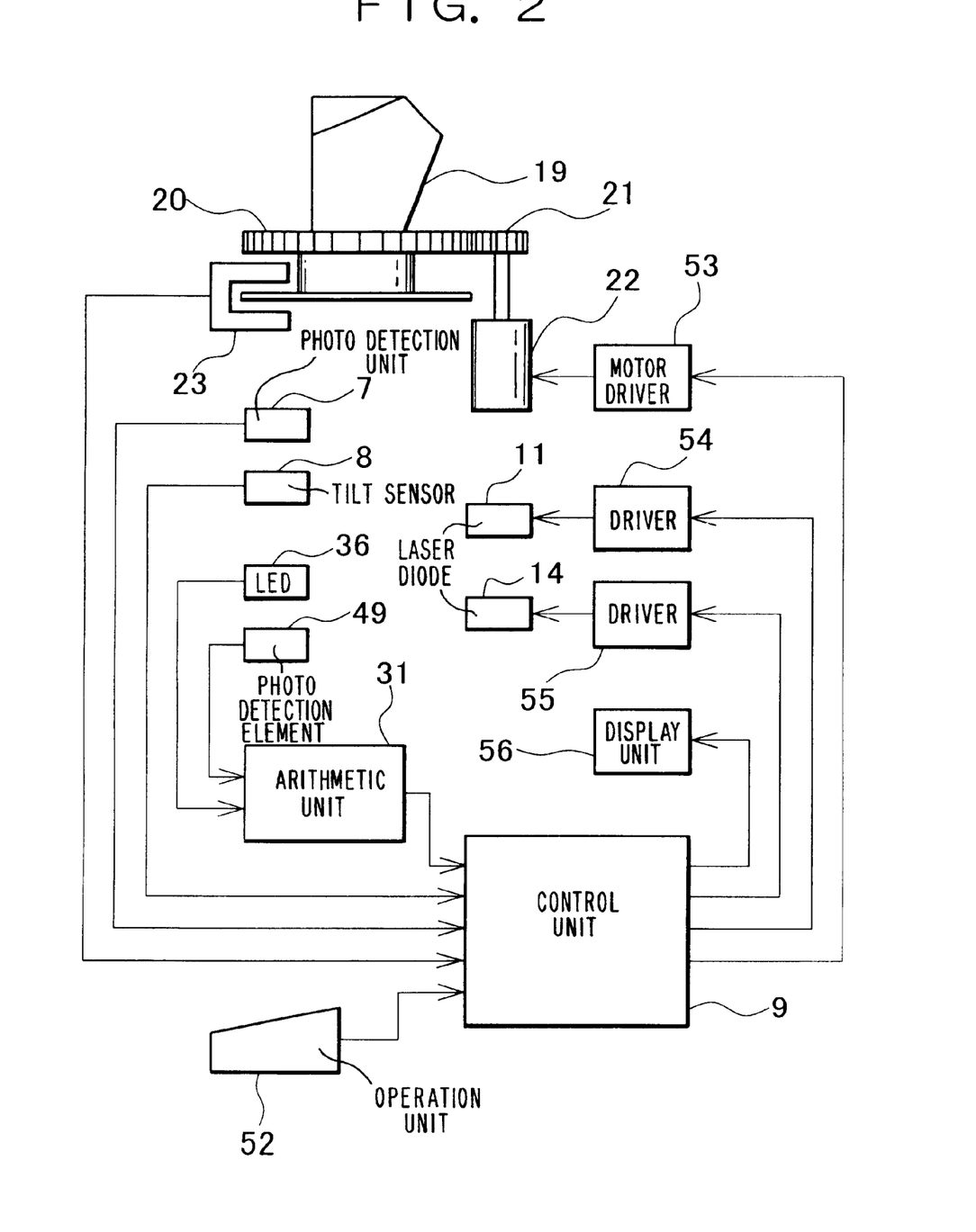
FIG. 2 is a block diagram showing an essential portion of the embodiment of the present invention.

Now, description will be given on the control unit 9, referring to FIG. 2.

A signal from the encoder 23 is inputted to the control unit 9, and signals from the photodetection unit 7, the tilt sensor 8 and the range-finding arithmetic unit 31 are also inputted. Based on a control signal from the control unit 9, the scanning motor 22 is driven by a motor driver 53. Drivers 54 and 55 are driven based on control signals from the control unit 9, and each of the first laser diode 11 and the second laser diode 14 is emitted. An operation unit 52 and a display unit 56 are connected to the control unit 9. From the operation unit 52, working instructions such as instruction for the setting of tilt angle for the reference line, instruction for starting and stopping of operation, etc. are inputted. Information on operating condition of the system or information to be sent to the object reflector 51 or information to be sent from the object reflector 51 is displayed on the display unit 56.

Control operation of the control unit 9 may be divided to an operation for the main unit 2 of the rotary laser irradiating system 1 and to an operation for the range-finding unit 4, and one of them may be used as a main control unit. By dividing the control operation in this manner, it is possible to separate the range-finding unit.

Figure 3:
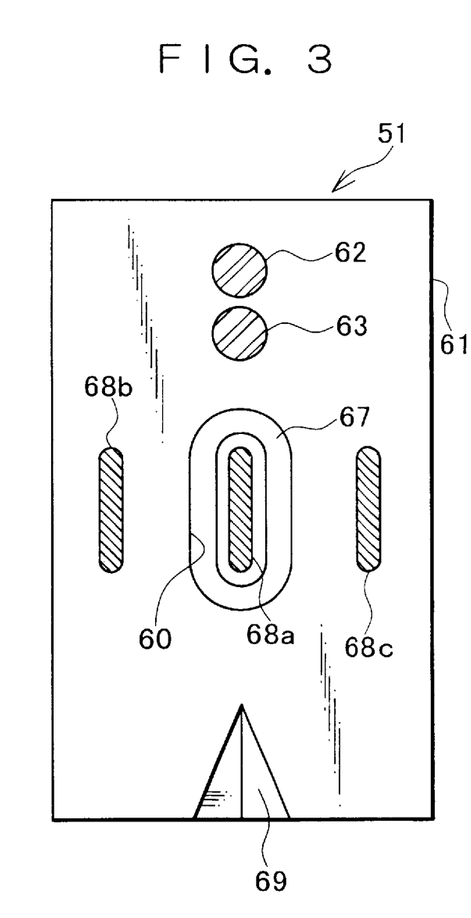
FIG. 3 is a front view of an object reflector to be used in the embodiment of the present invention.
Figure 4:
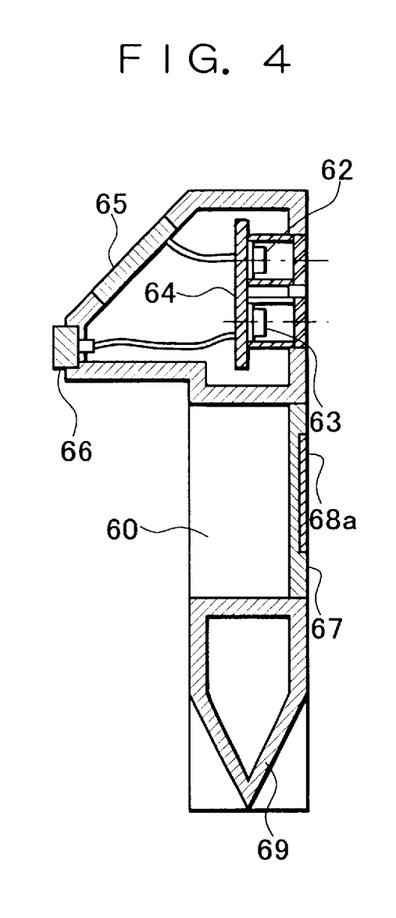
FIG. 4 is a cross-sectional elevation view of the object reflector.
Figure 5:
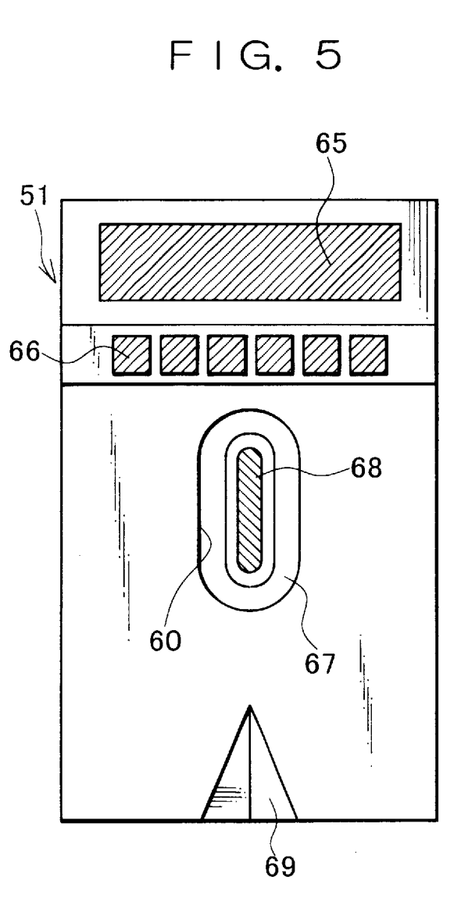
FIG. 5 is a rear view of the object reflector.

Referring to FIG. 3 to FIG. 5, description will be given now on the object reflector 51.

An oblong hole 60 is formed on the object reflector 51. On the opposed surface of a case 61, which has an inverted L-shaped cross-section, a light emitting element 62 and a photodetection element 63 are disposed. On the opposite side of the upper end of the case 61, an inclined display unit 65 is arranged. Inside the case 61, a control base plate 64 is provided. The light emitting element 62 and the photodetection element 63 are connected to the control base plate 64, and the display unit 65 and an operation switch 66 are also connected. The control base plate 64 drives the light emitting element 62 to emit light or modulates the light from the light emitting element 62 in order to transmit information. The modulated light is directed toward the main unit 2. Information signal synthesized by processing such as modulation from the range-finding light 82 (to be described later) as received at the photodetection element 63 is separated and detected. The result of the detection is displayed on the display unit 65. Because the surface of the display unit 65 is inclined, the content of display can be confirmed from any of horizontal or vertical direction. The operation switch 66 performs such operations as the setting of brightness of the display, switching of the display, etc.

In the oblong hole 60, a colored acrylic transparent plate 67 with diffusion effect is engaged. On the opposite side of the transparent plate 67, a reflection member 68a is attached. With the reflection member 68a at the center, reflection members 68b and 68c are attached at symmetrical positions. At the center on the lower end of the case 61, an indicator 69 is disposed by forming a V-shaped portion on it. It should be designed in such manner that, when this is used by pressing against the wall or the like, the display unit and the operation switch are positioned on one side.

In the following, description will be given on operation.

First, the setting of the horizontal reference plane and measurement of distance within the horizontal reference plane will be described.

The rotary laser irradiating system 1 is installed at a predetermined horizontal position. The installed position of the system is confirmed as follows: A part of the laser beam emitted from the first laser diode 11 passes through the pentagonal prism 19 and is turned to a laser beam 80b irradiating in a vertical direction. Further, the laser beam 81 emitted from the second laser diode 14 passes through the aperture of the aperture prism 33 and is projected in a downward vertical direction. The position of the rotary laser irradiating system 1 is determined by the laser beam 80b and the laser beam 81.

Horizontal positioning of the rotary laser irradiating system 1 is carried out by the tilt detecting unit 8. Leveling is performed in such manner that the tilt detected by the X-axis tilt sensor 25 and the Y-axis tilt sensor 26 is turned to zero, i.e. the horizontal plane is detected. Light is emitted from the first laser diode 11 via the driver 54 and is deflected toward the horizontal direction by the pentagonal prism 19 and is irradiated. The scanning motor 22 is driven by the motor driver 53, and the pentagonal prism 19 is rotated via the driving gear 21 and the scanning gear 20. The laser beam 80a is irradiated by rotary irradiation, and a horizontal reference plane is formed.

For marking operation, the object reflector 51 is disposed near a predetermined position so that the laser beam 80a is projected to the reflection members 68a, 68b and 68c by rotary scanning. By the reflection light from the reflection members 68a, 68b and 68c, the photodetection unit 7 recognizes the object reflector 51, and the laser beam is directed toward the center of the object reflector 51, i.e. the reflection member 68a, and is stopped. Marking operation is performed by using the indicator 69.

To measure the distance, the LED 36 is driven by the range-finding arithmetic unit 31, and the range-finding light 82 is emitted. Under this condition, the laser beam 80 is emitted from the first laser diode 11. The object reflector 51 is installed at a measuring point. The rotary laser irradiating system 1 recognizes the object reflector 51 positioned within the range of rotary irradiation and turns the rotator 3 toward the object reflector 51, and the rotator 3 is stopped under this condition. It can be easily determined whether the laser beam 80a is projected to the object reflector 51 or not by visually checking the laser beam 80a, which has passed through the transparent plate 67 and diffused, from the rear side of the object reflector 51. To improve visibility of the laser beam 80a, the rear surface of the transparent plate 67 is designed as a recessed surface. Further, it can be judged whether or not the laser beam 80a is correctly projected to the predetermined position of the object reflector 51 by confirming that the laser beam 80a reflected by the reflection member 68 has been detected by the photodetection unit 7.

When the laser beam 80a is correctly projected to the object reflector 51, the range-finding light 82 is reflected by the reflection members 68. Then, it passes through the pentagonal prism 19, the focusing optical system 6, and the aperture prism 33, and it enters the range-finding light photodetection unit 35. Upon entering the range-finding light photodetection unit 35, light amount of the range-finding light 82 varies according to the measured distance. The range-finding light 82 contains external disturbance light. The external disturbance light is removed by the band-pass filter 43 and is adjusted by the density filter 44 in such manner that it will have a constant light amount.

The range-finding light 82 reflected by the object reflector 51 and the reference light 82a divided by the optical path switching slit 41 enter the range-finding light photodetection element 49. The photodetection signal from the range-finding light photodetection element 49 contains signals by the range-finding light 82 and the reference light 82a. The range-finding arithmetic unit 31 calculates the distance to the object reflector 51 based on the two signals from the range-finding light photodetection element 49. The result of calculation is displayed on the display unit 56, or the range-finding arithmetic unit 31 is placed under the control of the control unit 9 and modulates the range-finding light 82 emitted from the LED 36, and information data is synthesized.

The object reflector 51 receives the range-finding light 82 with synthesized information on the photodetection element 63. The range-finding light 82 emitted from the LED 36 has a spreading angle. For this reason, light can be received sufficiently even when the photodetection element 63 is at a position slightly deviated from the optical axis of the laser beam 80a. The information synthesized in the range-finding light 82 is detected by the control base plate 64, and it is displayed on the display unit 65. The information to be synthesized in the range-finding light 82 is not limited to range-finding data, but it includes working information necessary for the personnel working near the object reflector 51, e.g. information on a direction to be corrected because the position of the object reflector 51 is not adequate. It is needless to say that information can also be synthesized by modulation of the laser beam 80.

When the distance to the object reflector 51 and an irradiating direction of the laser beam are detected, positioning of other points can be performed one after another using this position as a reference. Specifically, the object reflector 51 is moved to the next point, and the distance to the object reflector 51 and an irradiating direction of the laser beam are detected by the same procedure as described above. Angular deviation of the irradiating direction of the laser beam caused by the moving of the object reflector 51 is detected by the encoder 23. From the result of detection and the distance to two positions of the object reflector 51, the distance between the positions of the object reflector 51 before and after moving is calculated by the control unit 9. That is, positioning of the object reflector 51 is performed.

Next, description will be given on the case where a vertical reference plane and a tilt reference line are formed referring to FIG. 6 and FIG. 7.

The rotary laser irradiating system 1 is rotated at an angle of 90° around X-axis as described above or around an axis running in parallel to X-axis, and it is placed at laid-down position. In this laid-down position, the Y-axis tilt sensor 26 is at a vertical position while the Z-axis tilt sensor 27 is at a horizontal position. Therefore, using a leveling apparatus of known type (not shown), leveling of the rotary laser irradiating system 1 is performed in such manner that the X-axis tilt sensor 25 and the Z-axis tilt sensor 27 are positioned in a horizontal plane and tilting detected by the two sensors 25 and 27 are turned to 0. When leveling is performed with the system at laid-down position, the laser beam is deflected by the pentagonal prism 19, and the laser beam 80a irradiated from the rotator 3 by rotary irradiation forms a vertical reference plane.

Further, angular position of the pentagonal prism 19 is detected in advance by the encoder 23 so that the laser beam 80a deflected and irradiated by the pentagonal prism 19 runs in a horizontal direction. The result of detection is inputted to the control unit 9 by the operation unit 52. Therefore, when leveling is completed with the rotary laser irradiating system 1 in laid-down position, the angle of the irradiated laser beam 80a is promptly identified according to an angle detection signal from the encoder 23. When the irradiating angle of the laser beam 80a is inputted by the operation unit 52 and when the control unit 9 controls rotation of the scanning motor 22 via the motor driver 53 while monitoring the signal from the encoder 23, the irradiating angle of the laser beam 80a can be set.

Positioning of the rotary laser irradiating system 1 at laid-down position can be carried out by the use of the following laser beams: the laser beam 80b passing through the pentagonal prism 19, the laser beam 81 passing through the aperture prism 33, and the laser beam 80a deflected and irradiated by the rotator 3. The laser beam 80a and the laser beam 80b are projected in the directions perpendicular to each other. The LED 36 is driven, and the range-finding light 82 is emitted and the distance is measured.

Figure 6:
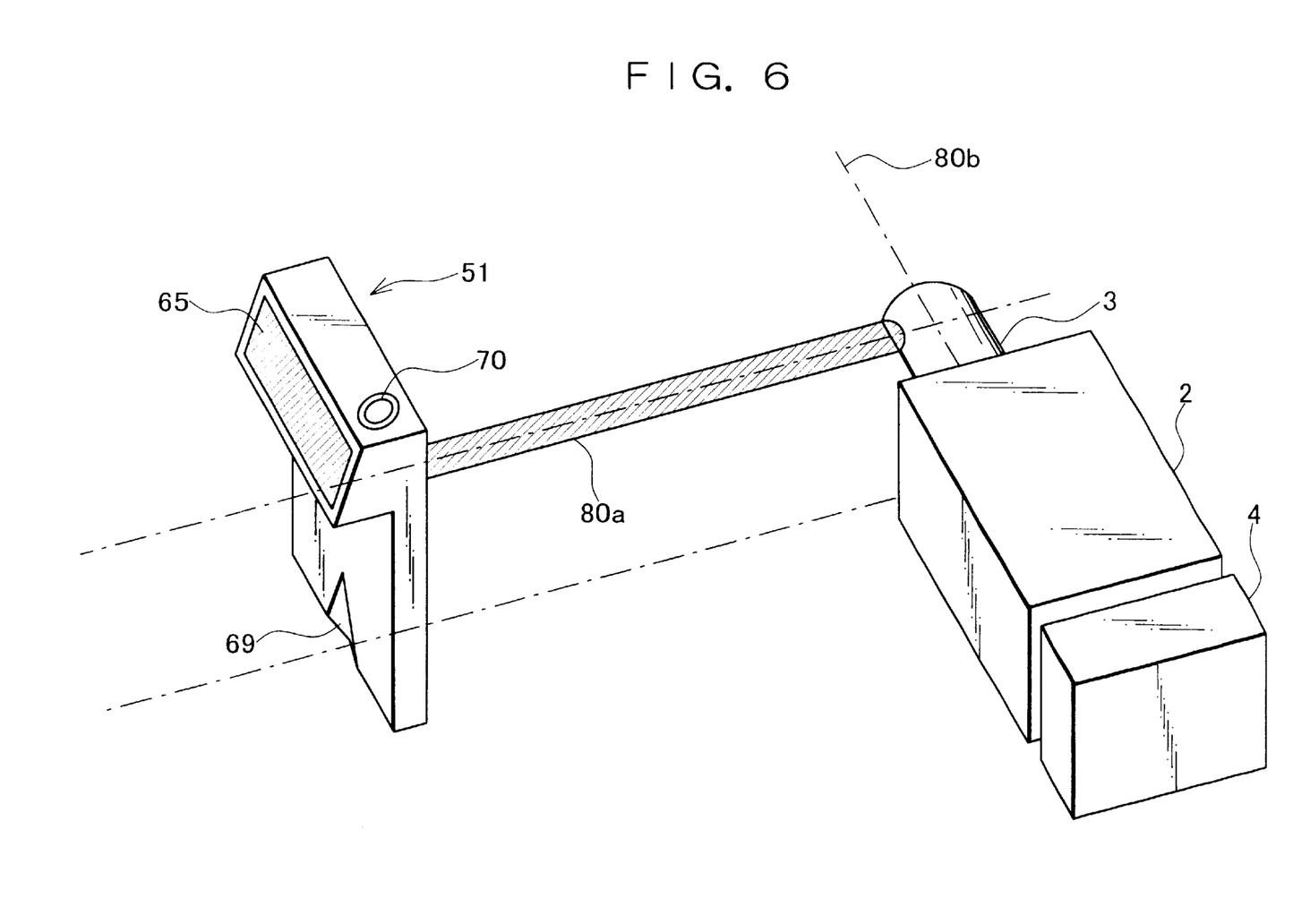
FIG. 6 is a drawing to explain operation of the embodiment of the present invention.
Figure 7A:
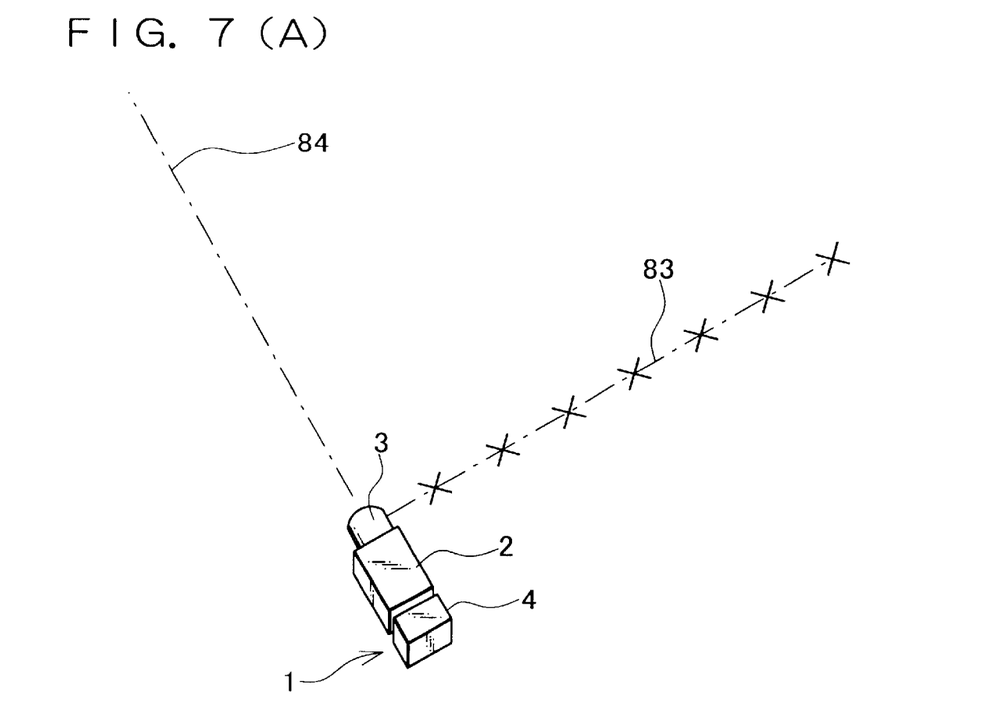
FIG. 7(A) and FIG. 7(B) each represents a drawing to explain operation of the embodiment of the present invention.

As shown in FIG. 6, the object reflector 51 is moved while the laser beam 80a is projected to an adequate position of the reflection member 68. Irradiation position of the laser beam 80a to the object reflector 51 is shifted up or down due to the factors such as undulation of the floor surface. Horizontal distance between the object reflector 51 and the main unit 2 is determined by the range-finding unit 4, and the result of measurement is displayed at real time on the display unit 65. Therefore, at a position where the measured distance displayed on the display unit 65 is turned to a predetermined value, marking operation is performed using the indicator 69 (See FIG. 7(A)).

Next, when marking operation along the predetermined reference line 83 has been completed and marking operation should be performed along a reference line 84, which runs perpendicularly to the reference line 83, the rotary laser irradiating system 1 is rotated at an angle of 90° within the horizontal plane, and marking operation is performed by the same procedure as described above. As a result, marking operation along the reference line 84 can be carried out (See FIG. 7(B)).

Figure 7B:
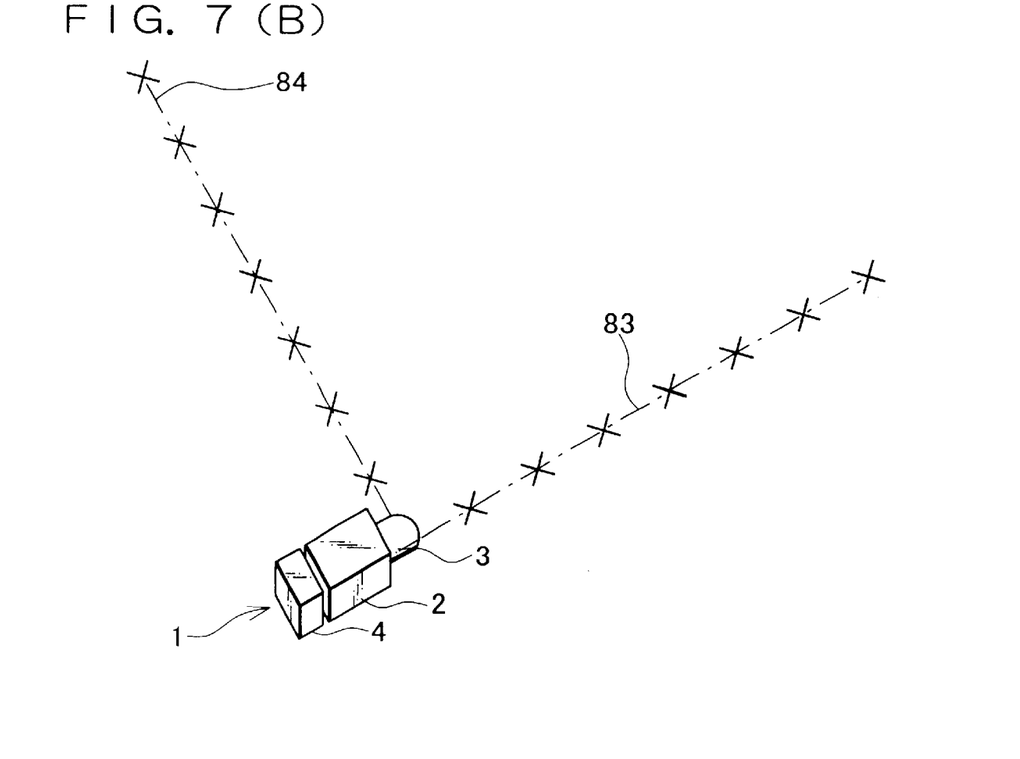

In case no erroneous operation occurs even when the range-finding light is deflected and irradiated by the pentagonal prism 19 and it passes through the pentagonal prism 19, and yet no erroneous operation occurs, the object reflector 51 is moved to the reference line 83 and the reference line 84 in FIG. 7(B) Then, marking operation can be performed on the two reference lines without changing position or posture of the main unit 2.

In case it is desired to project the position marked on the floor surface to a ceiling surface, the rotary laser irradiating system 1 is set at normal position and an irradiating position of the laser beam 81 is aligned with the marking position of the floor surface. Then, the position where the laser beam 80b is projected to the ceiling surface will be the point of projection.

Next, in case a tilt reference line is to be formed, leveling is performed with the system at laid-down position, and after positioning of the rotary laser irradiating system has been completed, a desired angle is set by the operation unit 52. The scanning motor 22 is rotated via the motor driver 53 at an angle inputted by the operation unit 52. The pentagonal prism 19 is rotated by a desired angle via the driving gear 21 and the scanning gear 20, and a rotation angle is detected by the encoder 23. As a result, an accurate tilt reference line is formed. A tilt angle is determined by the rotation angle of the rotator 3. Because the rotator 3 can be rotated over total circumference, any angle from acute angle to obtuse angle can be set.

The tilt reference line is used for such purposes as the setting of gradient in a staircase or the setting of gradient of inclined surface. Further, when distance measurement is performed with the tilt reference line thus formed, the distance along the tilt reference line can be measured, and this can be utilized for such operation as marking of the position of pillar on a handrail of staircase or installing a handrail on a wall surface facing to an inclined surface.

Figure 8:
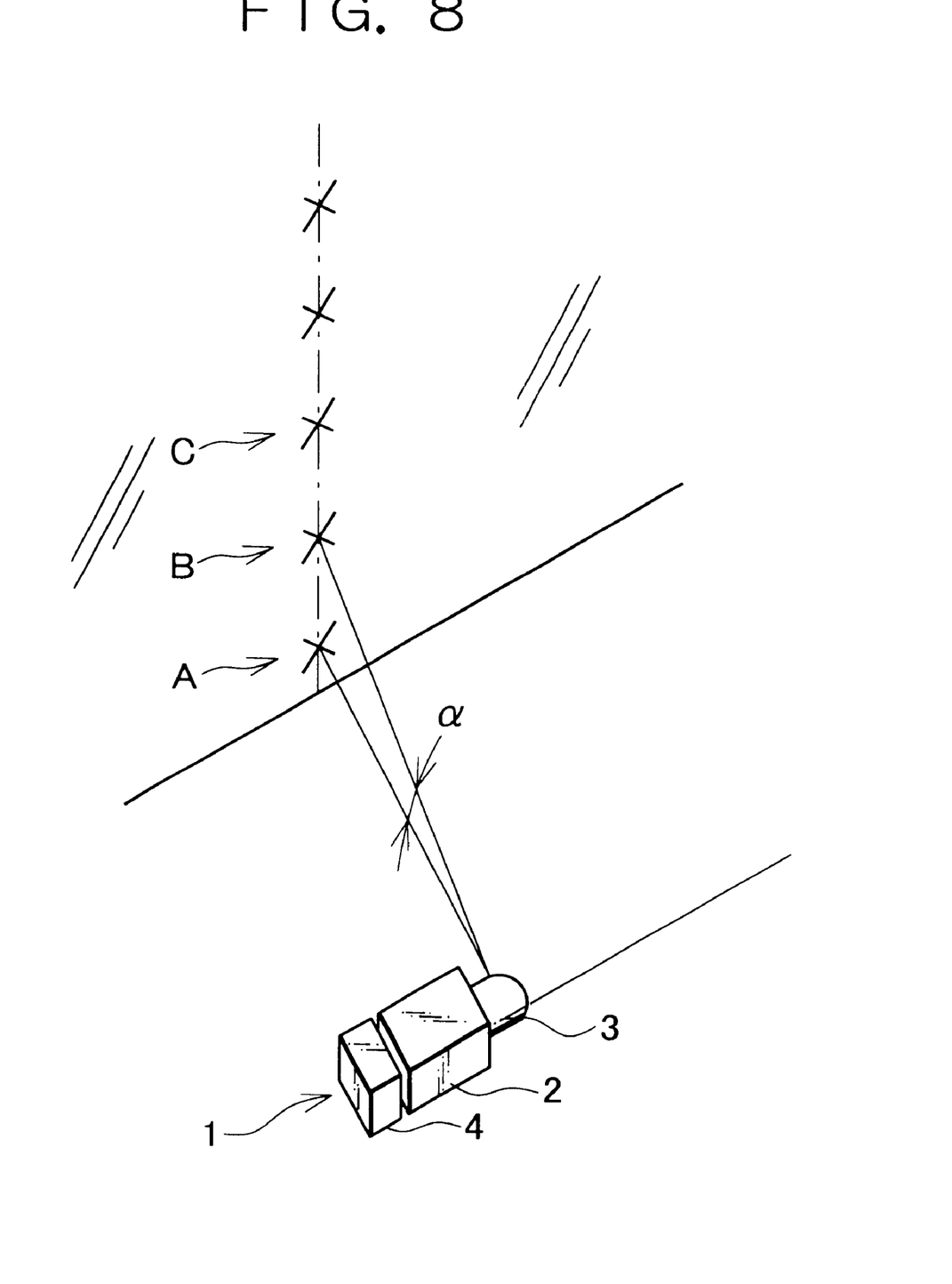
FIG. 8 is a drawing to explain operation of positioning in a vertical direction.

Next, positioning in a vertical direction of the system at laid-down position will be described referring to FIG. 8.

As described above, a plurality of reflection members 68a, 68b and 68c are disposed on the front side of the object reflector 51. When the laser beam is irradiated by rotary scanning and the photodetection unit 7 receives reflection light from the reflection members, the object reflector 51 is recognized. Then, the laser beam is projected to the center of the object reflector 51 and scanning is stopped. If it is supposed that the position of the object reflector 51 in this case is A, a distance to the position A and a direction of the position A are detected. Next, when the object reflector 51 is moved to a position B, the rotary laser irradiating system again irradiates laser beam by rotary scanning. The laser beam is projected to the center of the object reflector 51 at the position B, and a distance and a direction are detected.

The control unit 9 calculates a distance from the position A to the position B based on the rotation angle of the encoder 23 and the distance of the range-finding unit. Similarly, a distance from the position A to the position C is calculated, and the result of calculation is displayed on the display unit 65 of the object reflector 51. In this way, positioning in a vertical direction is performed.

A method for detecting a plurality of reflection surfaces of the object reflector 51 is described, for example, in JP-A-6-137870. That is, the laser beams reflected from the three reflection members are received by the photodetection unit. Based on three pulses thus obtained and on the output of the encoder 23, the laser beam can be directed to the central position of the object reflector 51. To change the distance from the position A to the distance from the position C, it is necessary to reset for once. The reset signal can be transmitted by the light beam emitted from the light emitting element 62 on the object reflector 51 to the rotary laser irradiating system 1 as to be described later.

Description will be given now on other means for transmitting the signal from the object reflector 51 to the rotary laser irradiating system 1 referring to FIG. 9 and FIG. 10.

The rotary laser irradiating system 1 irradiates a polarized laser beam, and the photodetection unit 7 comprises a polarization beam splitter, a first detecting unit and a second detecting unit. It is designed in such manner that the polarization beam splitter separates and splits laser beams having different polarization planes, and that the photodetection unit 7 receives the laser beams having different polarization planes thus split—separately by the first detecting unit and the second detecting unit.

Figure 9:
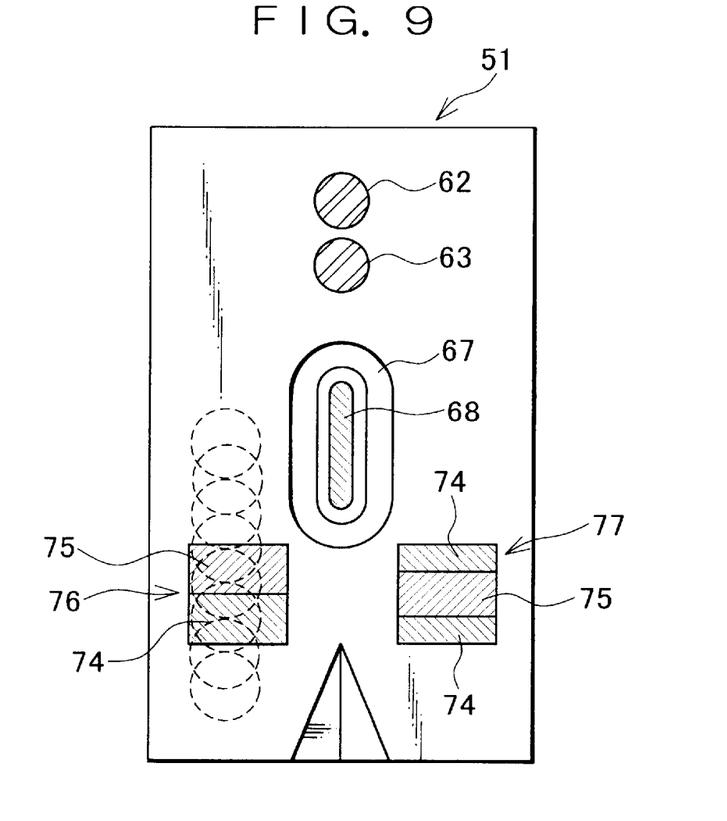
FIG. 9 is a front view of another type of object reflector.
Figure 10:
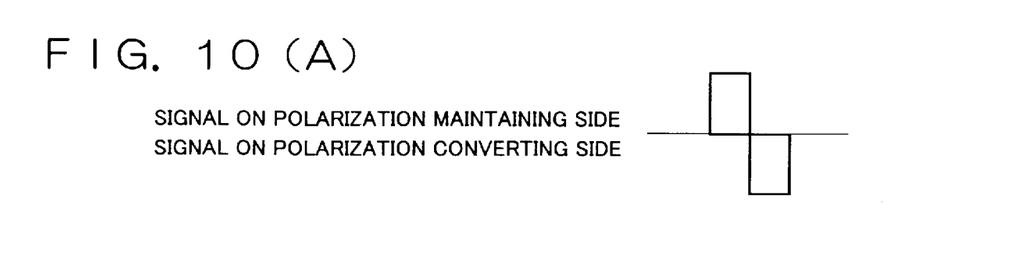
FIG. 10 shows patterns of photodetection signals from said another type of object reflector.

As shown in FIG. 9, on the opposed surface of the object reflector 51 and at positions other than the reflection members 68, a plurality of reflection patterns 76 and 77 are formed, which comprise respectively a polarization converting section 74 having a reflection plate and a $\lambda/4$ birefringence member attached on it and a polarization maintaining section 75 having only a reflection plate attached on it.

The combination of the polarization converting section 74 and the polarization maintaining section 75 is changed by varying the reflection pattern 76 and the reflection pattern 77, and photodetection signal from the photodetection unit 7 can be varied. For example, in the reflection pattern 76 shown in FIG. 9, one polarization converting section 74 and one polarization maintaining section 75 each having the same shape are arranged. When the reflection pattern 76 is scanned by the laser beam 80a or in case the object reflector 51 is moved with respect to the laser beam 80a, the photodetection signal from the photodetection unit 7 will be as shown in FIG. 10(A). In the reflection pattern 77, two polarization converting sections 74 and one polarization maintaining section 75 are arranged alternately. When the reflection pattern 77s is relatively moved with respect to the laser beam 80a, the photodetection signal from the photodetection unit 7 will be as shown in FIG. 10(B).

If it is designed in such manner that the control unit 9 has a function to recognize the pattern and a predetermined control signal is issued in response to the pattern, it is possible to transmit a command signal to the rotary laser irradiating system 1 even when the object reflector 51 is not provided with a specific transmitting function. For example, in the pattern shown in FIG. 10(A), the rotary laser irradiating system 1 is set into a rotation mode. In the pattern shown in FIG. 10(B), the rotary laser irradiating system 1 is set into a range-finding mode.

Various types of patterns can be conceived according to the combination of the polarization converting section 74 and the polarization maintaining section 75. If a non-reflection section is provided on the boundary between the polarization converting section 74 and the polarization maintaining section 75, it is possible to arrange a polarization converting section 74 and another polarization converting section 74 at adjacent positions or to arrange a polarization maintaining section 75 and another polarization maintaining section 75 at adjacent positions, and this provides more diversified pattern. Therefore, it is possible to increase the types of commands to be given from the object reflector 51 to the rotary laser irradiating system 1.

The range-finding unit 4 is removably arranged with respect to the main unit 2 and is unitized, and it can be easily mounted by fastening means such as bolt. The range-finding unit 4 and the main unit 2 are electrically connected by a connector (not shown) so that a power supply on the main unit 2 can be used to supply electric power to the range-finding unit 4.

As described above, the range-finding light emitting unit 34, the range-finding light photodetection unit 35 and the range-finding arithmetic unit 31 are arranged on the main unit 2, and the object reflector 51 comprises the light emitting element 62, the photodetection element 63 and the control base plate 64. As a result, mutual communication by modulated light can be achieved between the main unit 2 and the object reflector 51.

In the following, description will be given on mutual communication between the main unit 2 and the object reflector 51.

By operating the operation switch 66 of the object reflector 51, the control base plate 64 drives the light emitting element 62, e.g. an LED, and a light beam modulated to a predetermined modulation frequency is emitted from the light emitting element 62. Oscillation frequency from the light emitting element 62 is designed to be closer or equal to that of the laser beam 80a.

The light beam from the light emitting element 62 runs along the optical axis of the laser beam 80, and it passes through the pentagonal prism 19 and the aperture mirror 16 and is received at the photodetection unit 7. Because oscillation frequency of the light emitting element 62 is equal to that of the laser beam 80a, the light reaches the photodetection unit 7, and not the range-finding light photodetection unit 35. Therefore, even when light is emitted erroneously from the light emitting element 62 during range-finding operation, erroneous range-finding operation can be prevented.

Figure 11:
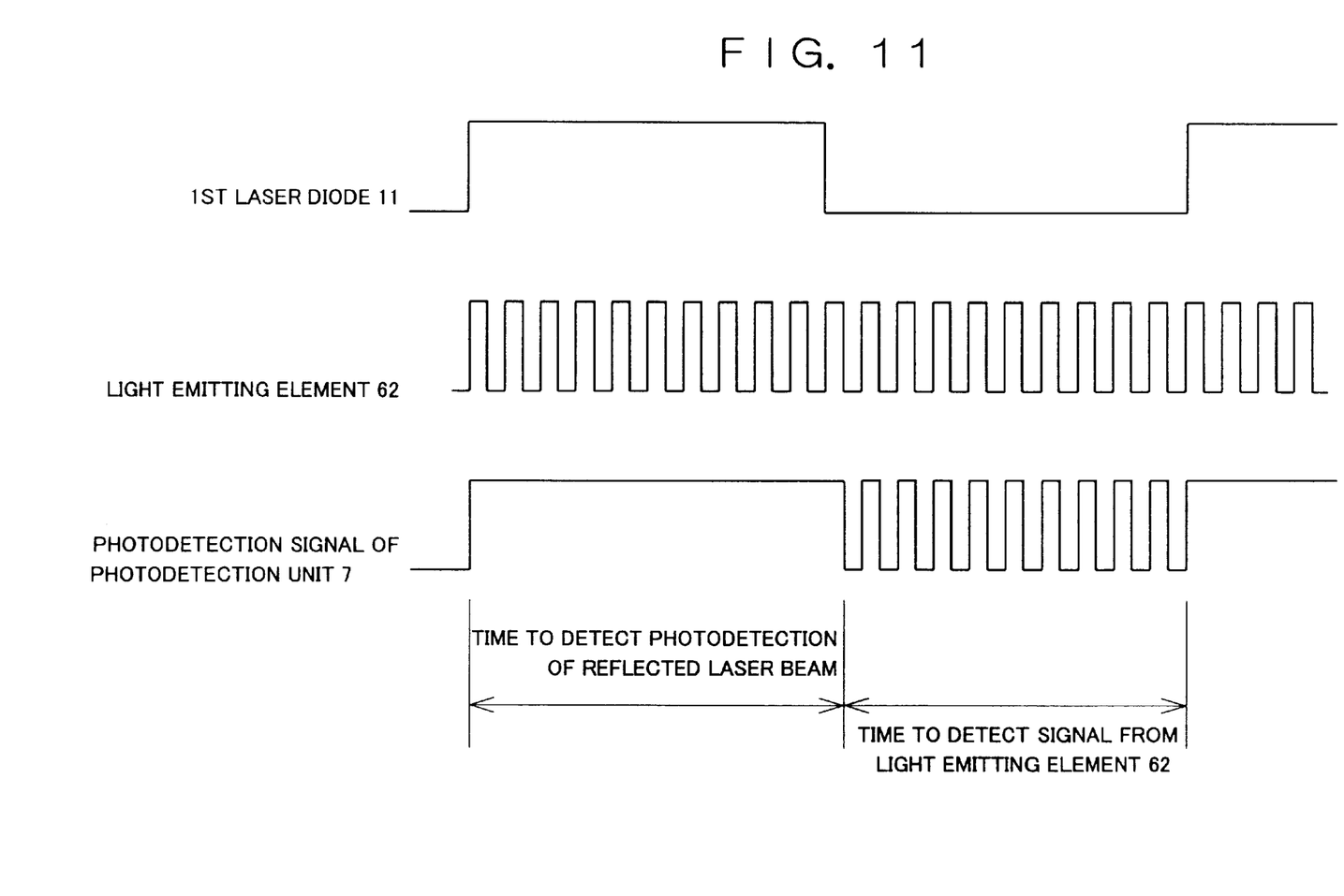
FIG. 11 is a drawing to represent modulation statuses of laser beam and range-finding light and status of photodetection signal of a photodetection unit.

During information communication, the laser beam reflected by the object reflector 51 and the light from the light emitting element 62 enter the photodetection unit 7. In case the laser beam 80a is continuously emitted, the light beam from the light emitting element 62 cannot be recognized unless the light amount from the light emitting element 62 is greater than the light amount of the laser beam 80a. For this reason, as shown in FIG. 11, the first laser diode 11 is oscillated in light emitting status modulated to duty 50% and 100 Hz, for example. For the light emitting element 62, it is oscillated at modulation frequency higher than the modulation frequency of the first laser diode 11, e.g. modulation frequency of 1 kHz, 2 kHz, . . .

For the photodetection signal from the photodetection unit 7, if the detection time of the photodetection signal from the light emitting element 62 is set to the time when oscillation of the first laser diode 11 is turned off, the photodetection signal from the light emitting element 62 can be separated and identified from the laser beam 80a.

Next, description will be given on the case where oscillation frequency of the light emitting element 62 is made equal to that of the range-finding light 82.

If it is designed in such manner that there is an apparent difference between the modulation frequency of the light beam from the light emitting element 62 and the modulation frequency of the range-finding light 82 and that there is provided a safety apparatus in which data cannot be transmitted from the object reflector 51 unless transmission of range-finding data from the rotary laser irradiating system 1 has been completed, it is possible to receive the light beam from the light emitting element 62 at the range-finding light photodetection unit 35 and to receive the data from the object reflector 51.

As the data to be transmitted from the object reflector 51 to the rotary laser irradiating system 1, there are instructions on angle setting of the tilt reference line in a range-finding mode, a rotary scanning mode of the laser beam 80a, or a stopping mode of the laser beam 80a. Because the instruction can be set from the object reflector 51 to the rotary laser irradiating system 1, the operator can perform most of the works on the object reflector 51 side, and this contributes to the improvement of working efficiency.

As described above, the range-finding unit 4 is removably arranged with respect to the main unit 2. When range-finding operation is not performed, the range-finding unit 4 may be removed, and it can be used only for forming the reference plane and the reference line.

According to the present invention, there is no need to provide a specific mechanism for the setting of a tilt reference plane. By setting the main unit in laid-down position, a tilt reference line with any desired angle can be easily set. Further, range-finding operation can be performed at the same time. This makes it possible to extensively improve working efficiency and to perform information communication using the range-finding light.

What is claimed is:

1. A rotary laser irradiating system, comprising a main unit, a rotator rotatably mounted on said main unit, and a range-finding unit disposed on said main unit; wherein said main unit comprises a light emitting unit for emitting a laser beam, optical means for directing said laser beam and a range-finding light from said range-finding unit toward said rotator, and tilt sensors for detecting horizontality and verticality of a rotation axis of said rotator; wherein said rotator comprises deflecting means for deflecting the laser beam and the range-finding light from said optical means and rotating position detecting means for detecting a rotating position of the rotator; and wherein said rotating position detecting means is designed to project said laser beam and said range-finding light in a predetermined direction.

2. A rotary laser irradiating system according to claim 1, wherein said tilt sensor comprises a tilt sensor for detecting horizontality of the rotation axis, and said rotating position detecting means projects said laser beam and said range-finding light to a plane including said rotation axis.

3. A rotary laser irradiating system according to claim 1, wherein said deflecting means transmits both a part of the laser beam and a part of the range-finding light in parallel to the rotation axis of said rotator.

4. A rotary laser irradiating system according to claim 1, wherein said range-finding unit comprises means for modulating the range-finding light and synthesizing range-finding data by modulating said range-finding light and transmitting said data.

5. A rotary laser irradiating system according to claim 1, wherein there is further provided an object reflector and the laser beam emitted from said light emitting unit is a visible light; wherein said object reflector comprises diffusion means for diffusing said laser beam from said deflection means to visually confirm the laser beam, photodetecting means receives the range-finding light from said deflecting means, reflection members reflect said range-finding light, a photodetecting circuit detects a range-finding data from the range-finding light based on a signal from said photodetecting means, and a display unit displays said range-finding data.

6. A rotary laser irradiating system according to claim 5, wherein said object reflector comprises reflection members for reflecting the laser beam and said main unit comprises a photodetection unit for receiving the laser beam reflected by said object reflector, wherein rotation of a laser irradiation is stopped on said object reflector when the reflected laser beam is received by the photodetection unit.

7. A rotary laser irradiating system according to claim 5, wherein said object reflector comprises a light emitting element for emitting a light toward the deflecting means, and a modulation circuit for modulating the light beam from said light emitting element and for synthesizing a data to be transmitted to the main unit.

8. A rotary laser irradiating system according to claim 1, wherein said range-finding unit is removably arranged with respect to the main unit.

9. A rotary laser irradiating system according to claim 1, wherein said main unit comprises a light emission control unit for modulating the laser beam from said light emitting unit, wherein said light emission control unit modulates the laser beam based on a range-finding data from said range-finding unit and wherein the range-finding data is transmitted according to the modulation.

10. A rotary laser irradiating system according to claim 1, wherein said main unit comprises focusing means and said focusing means focuses the laser beam on the object reflector based on the range-finding data.

11. A rotary laser irradiating system according to claim 1, wherein a first position and a second position designated by said object reflector are measured by said range-finding unit and said rotating position detecting means, and a distance from the first position to the second position is calculated according to the measurement data.

12. A rotary laser irradiating system according to claim 10, wherein the distance from the first position to the second position is displayed on the display unit of the object reflector.

13. A rotary laser irradiating system according to claim 10 or 11, wherein there is provided a tilt sensor for detecting horizontality of a plane perpendicular to the rotation axis, and a distance from the first position to the second position is measured on the horizontal plane.

* * * * *